United States Patent [19]
Seidel

[11] B 3,916,571
[45] Nov. 4, 1975

[54] CAM CONTROLLED MACHINE TOOLS WITH CONTOUR COMPENSATOR

[75] Inventor: William B. Seidel, Birmingham, Mich.

[73] Assignee: The Babcock & Wilcox Company, New York, N.Y.

[22] Filed: Dec. 27, 1972

[21] Appl. No.: 318,745

[44] Published under the Trial Voluntary Protest Program on January 28, 1975 as document no. B 318,745.

[52] U.S. Cl............ 51/101 R; 51/165.71; 51/165.89; 51/DIG. 32; 90/13.4; 318/578
[51] Int. Cl..................... B24B 17/00; B24B 49/00
[58] Field of Search ...... 51/101 R, 101 LG, 165.71, 51/165.77, 165.89, 165.93, DIG. 32; 74/568 M; 82/1.3; 90/13.4, 13.7; 318/568, 578

[56] References Cited
UNITED STATES PATENTS

| | | | |
|---|---|---|---|
| 2,282,038 | 5/1942 | Davenport | 125/11 TP |
| 3,469,495 | 10/1969 | Kelly | 318/578 X |
| 3,653,161 | 5/1972 | Clark | 51/49 X |
| 3,750,345 | 8/1973 | Kolesar | 51/101 R |

Primary Examiner—Al Lawrence Smith
Assistant Examiner—Nicholas P. Godici
Attorney, Agent, or Firm—Barnes, Kisselle, Raisch & Choate

[57] ABSTRACT

A machine tool wherein a workpiece is mounted for lineal and rotational movement in relationship to a tool which is separately mounted for lineal movement relative to the workpiece. The movement of the workpiece is regulated by a second cam or template. The movements of both are coordinated to effect the formation of the workpiece shape to a high accuracy. Programmable means are provided for modifying the movement of the tool as desired from that which is provided by the template.

5 Claims, 6 Drawing Figures

CAM CONTROLLED MACHINE TOOLS WITH CONTOUR COMPENSATOR

This invention relates to machine tools and particularly machine tools which are utilized to provide parts of varying configuration.

BACKGROUND OF THE INVENTION

In the production of parts repetitively, for example, by grinding, it is common to utilize a cam controlled machine wherein the cam contour corresponds to the contour of the part to be produced. Theoretically, if there is an accurate trace or follow of the cam, the part produced will have the desired accuracy. However, in production, the parts may deviate even though the machine is accurate because clamping forces, grinding or machining forces, and thermal distortion due to grinding may cause a variation from the desired contour. In addition, when the machining operation is across an opening such as a hole for the passage of fluid, there is an excess removal of material resulting in inaccuracy. Finally, of course, the machine itself may not be as accurate as theoretically designed.

In addition, the part may in use be subjected to thermal distortion, undesirable wear, or distortion during assembly so that it is often necessary to change the machining contour to compensate for these occurrences. This change necessitates a change in the cam which not only is time-consuming and costly but is difficult.

Among the objects of the invention are to provide an electronic contour compensator on a machine tool which can be utilized to provide any change in contour as may be desired at any particular point along the cam in order to provide the desired contour in the production part; which is easily programmable; which can be readily changed without affecting the setting at other points along the cam; which produces the desired contour precisely and accurately.

In the copending application Ser. No. 231,882, filed Mar. 6, 1972, now U.S. Pat. No. 3,750,345 issued Aug. 7, 1973, and having a common assignee with the present application, there is disclosed and claimed a machine that is particularly designed for producing complex configurations such as the epitrochoid-shaped periphery of a combustion chamber for a Wankel type rotary engine. In such a combustion chamber, the aforementioned occurrences may be found. Thus, clamping forces, grinding forces, the thermal distortion due to grinding and holes in the ground surface for exhaust or sparkplugs may produce a deviation from the desired accurate contour. Further, the thermal distortion occurring in use from combustion heat, undesirable wear patterns, and distortion caused by bolting may further cause deviations from the desired accurate contour. Accordingly, among the further objects of the invention are to provide an improved machine of the aforementioned design which incorporates a contour compensator so that the contour of the part can be changed at any point without having to change the cam or template utilized.

SUMMARY OF THE INVENTION

In accordance with the invention, a machine tool embodying the invention includes a cam and cam follower for controlling the movement of a tool relative to the workpiece. Programmable means are provided for electronically modifying the movement of the tool with respect to the workpiece in an amount sufficient to change the contour at any predetermined location along the cam to produce the desired contour in the completed part.

DESCRIPTION

The invention is to be described in connection with a machine of the type disclosed and claimed in the aforementioned patent application Ser. No. 231,882 but, as will be noted hereinafter, the invention can be used in connection with other types of machine tools.

Figure 1:
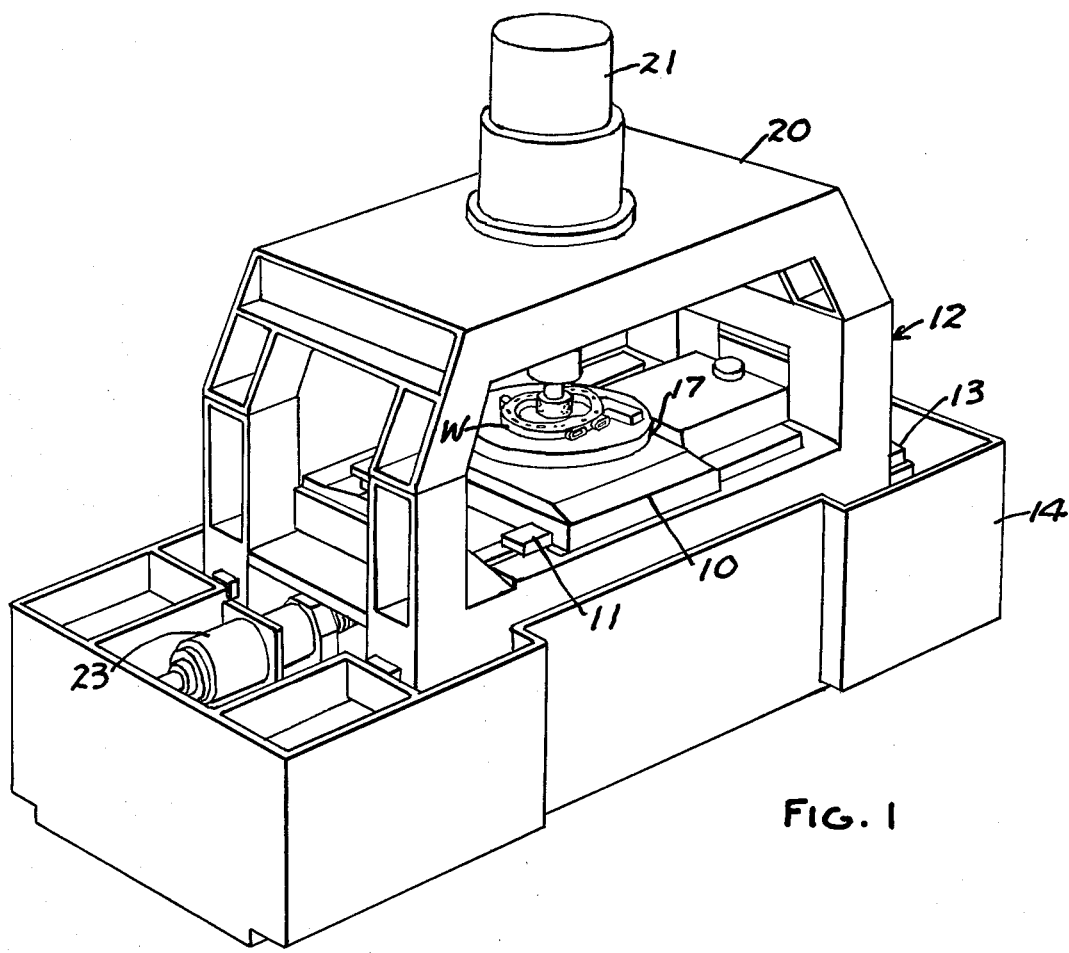
FIG. 1 is a perspective view of a machine tool embodying the invention.
Figure 2:
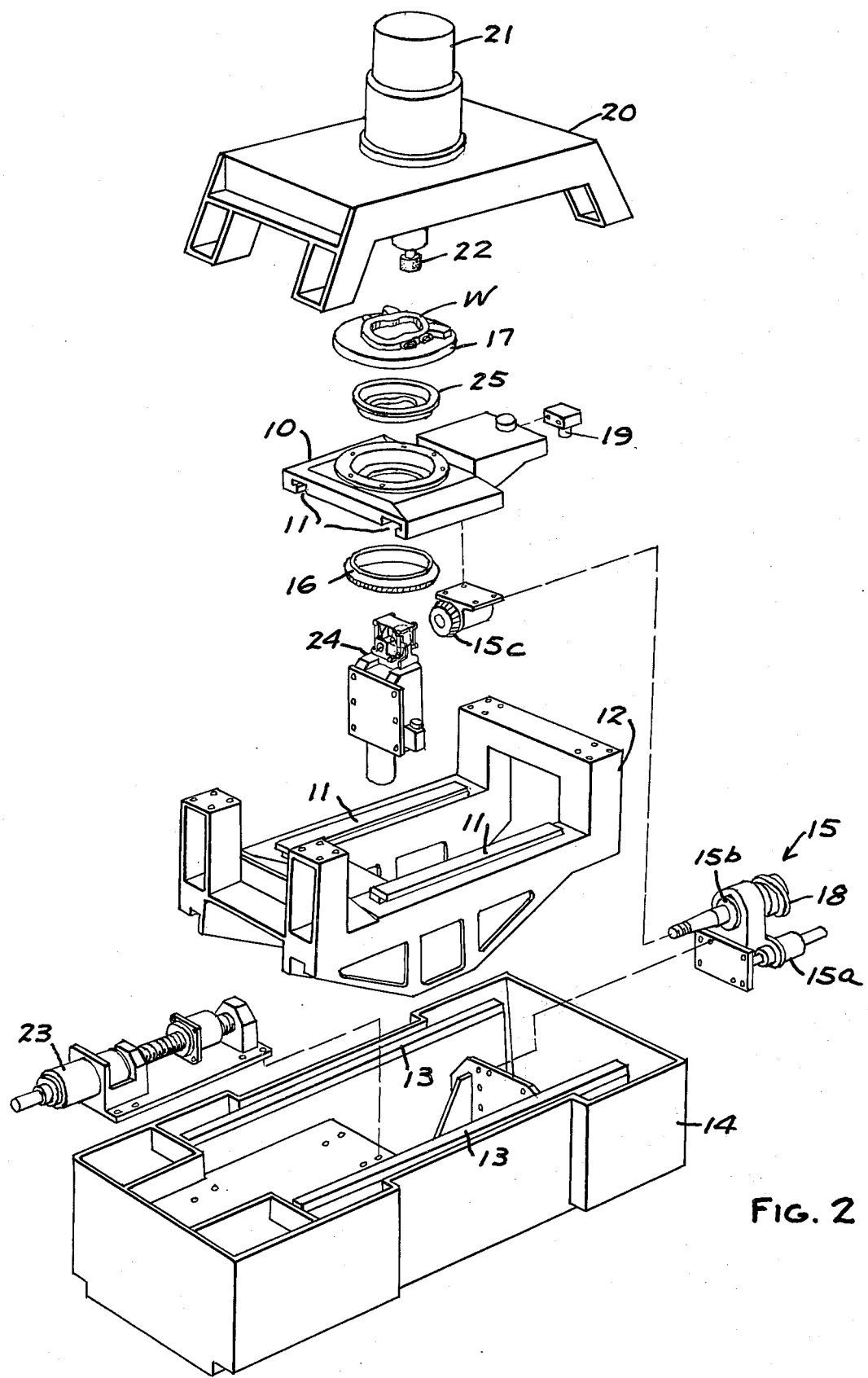
FIG. 2 is an exploded perspective view of the same.

Referring to FIGS. 1 and 2, the machine embodying the invention comprises a primary slide 10 which is supported for linear horizontal movement by hydrostatic bearings 11 on a secondary slide 12. The secondary slide 12 is, in turn, supported by hydrostatic bearings 13 on a base 14. The workpiece W, shown as being the combustion chamber for a Wankel engine, is supported on a rotary support 17 on the primary slide 10. A primary servo drive 15 comprising an electrically controlled hydraulic motor 15a is mounted on the base 14 and functions through a ball spline 15b to rotate a gear 15c rotatably mounted on primary slide 10. A gear 16 meshes with gear 15c and is connected to the workpiece support 17 which is rotatably mounted in the primary slide 10. Servo drive 15 also rotates a cam 18 which functions to reciprocate the slide 10 on the slide 12 through a cam follower 19. The machine further includes a spindle 21 which rotatably drives the grinding wheel 22. A secondary servo drive 23 mounted on the base 14 functions to move the secondary slide 12 as may be determined by engagement of a follower 24 with a secondary cam or template 25 that rotates with the workpiece support 17.

As set forth in the aforementioned application, the secondary cam or template 25 is used to control the secondary or fine positioning of the secondary slide 12 and, in turn, the grinding wheel 22. Since the secondary cam is close coupled to the part and the follower or tracer 24 is coincident with the spindle, the spindle in effect grinds only in its proper position on the part nulling any errors in synchronization between the rotary table and the primary slide.

Figure 3:
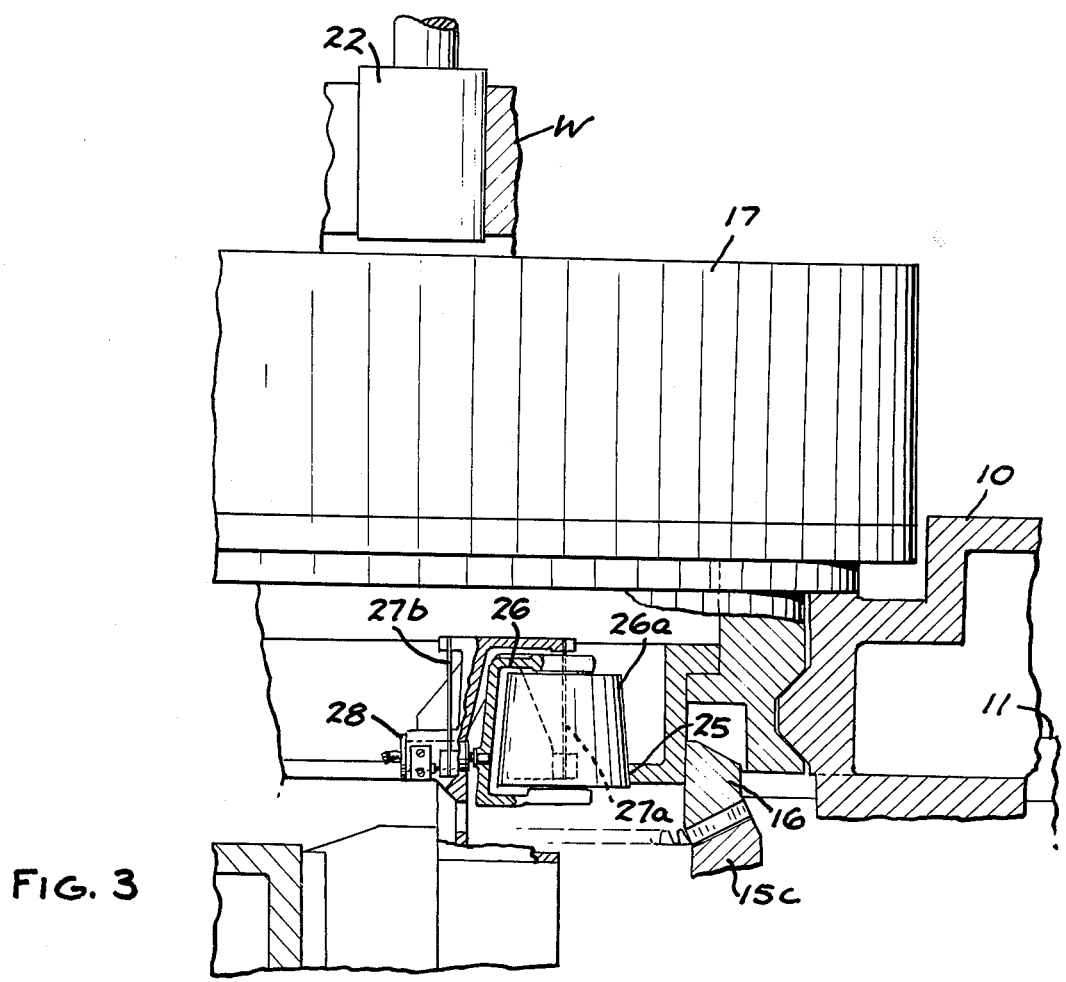
FIG. 3 is a fragmentary sectional elevational view on an enlarged scale of a portion of the machine tool.
Figure 4:
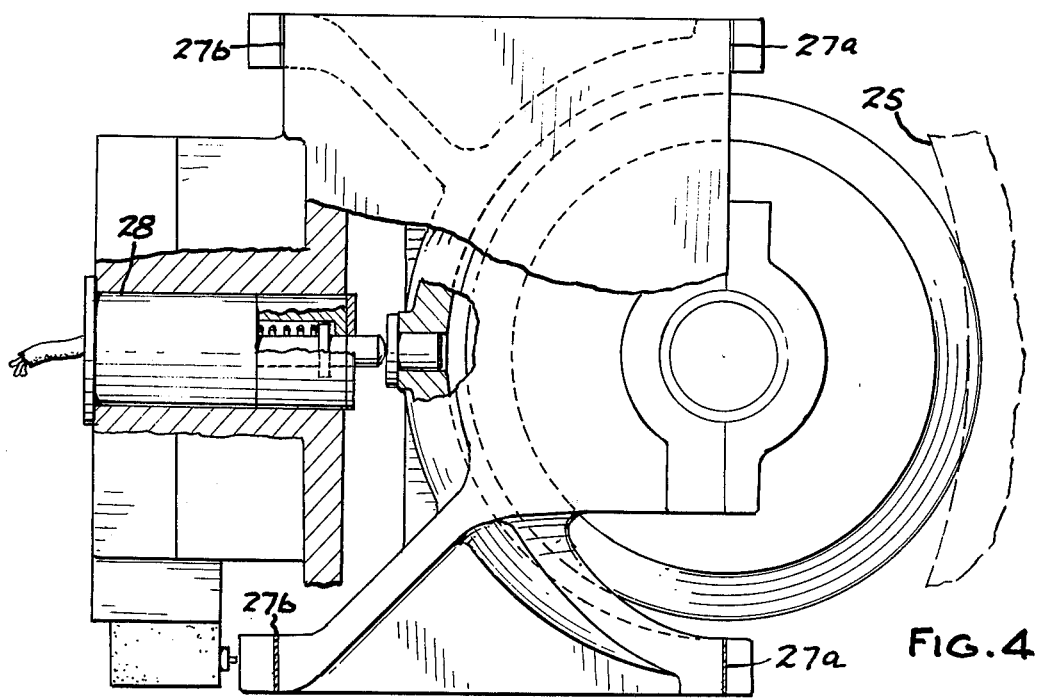
FIG. 4 is a fragmentary part sectional view of the portion of the machine tool shown in FIG. 3.

Referring to FIGS. 3 and 4, the cam follower or tracer 24 for the secondary cam 25 is of the electro hydraulic type and comprises a tracer 26 having a rotatable stylus or cam follower 26a supported by spaced pairs of reeds 27, 27a, 27b operable upon an LVDT 28 to produce an analog signal corresponding to the relative position of the tracer with respect to the accurately formed secondary cam or template 25. This signal produces a control for the secondary servo drive 23 to move the secondary slide 21 as may be needed.

In accordance with the invention, programmable means are provided for changing the electrical signal from the LVDT 28 at any point along the cam 25 so that the electrical signal to the secondary servo drive 23 is modified an amount sufficient to compensate for the cam contour as may be desired.

Thus, as explained above, in the event it is determined that either in production or after production, the desired contour has not been provided to the part or workpiece, the operator may program a change in the contour which will then modify the signal received from the LVDT 28 for that location causing the machine to modify the contour of the part being made.

In order to achieve such compensation, the apparatus contemplates dividing the same contour of the secondary cam 25 into a plurality of equal memory locations and the apparatus is capable of changing the contour at each of the memory locations. Thus, for example, the contour of the cam can be divided into 120 increments of 3° each which are the memory locations for that cam.

Figure 7:
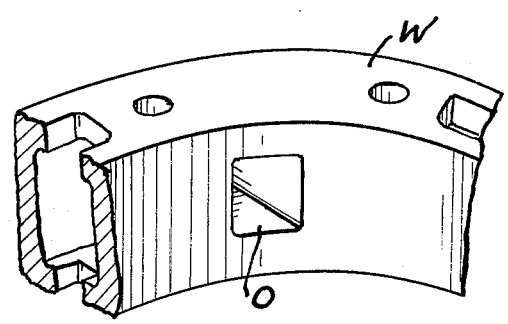
FIG. 7 is a fragmentary perspective view of a workpiece.
Figure 8:
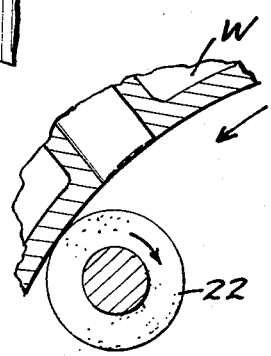
FIG. 8 is a fragmentary plan view of a workpiece.

For exammple, as shown in FIGS. 7 and 8, in the case of a Wankel combustion chamber W if it is determined that more material is being removed in the area of an exhaust opening O, the machine can be programmed to make a desired change in the operation without changing any cam or template.

In accordance with the invention, in a normal programming procedure, the operator will select a deviation for each memory location, enter the deviation, and then proceed to enter subsequent desired deviations.

Figure 6:
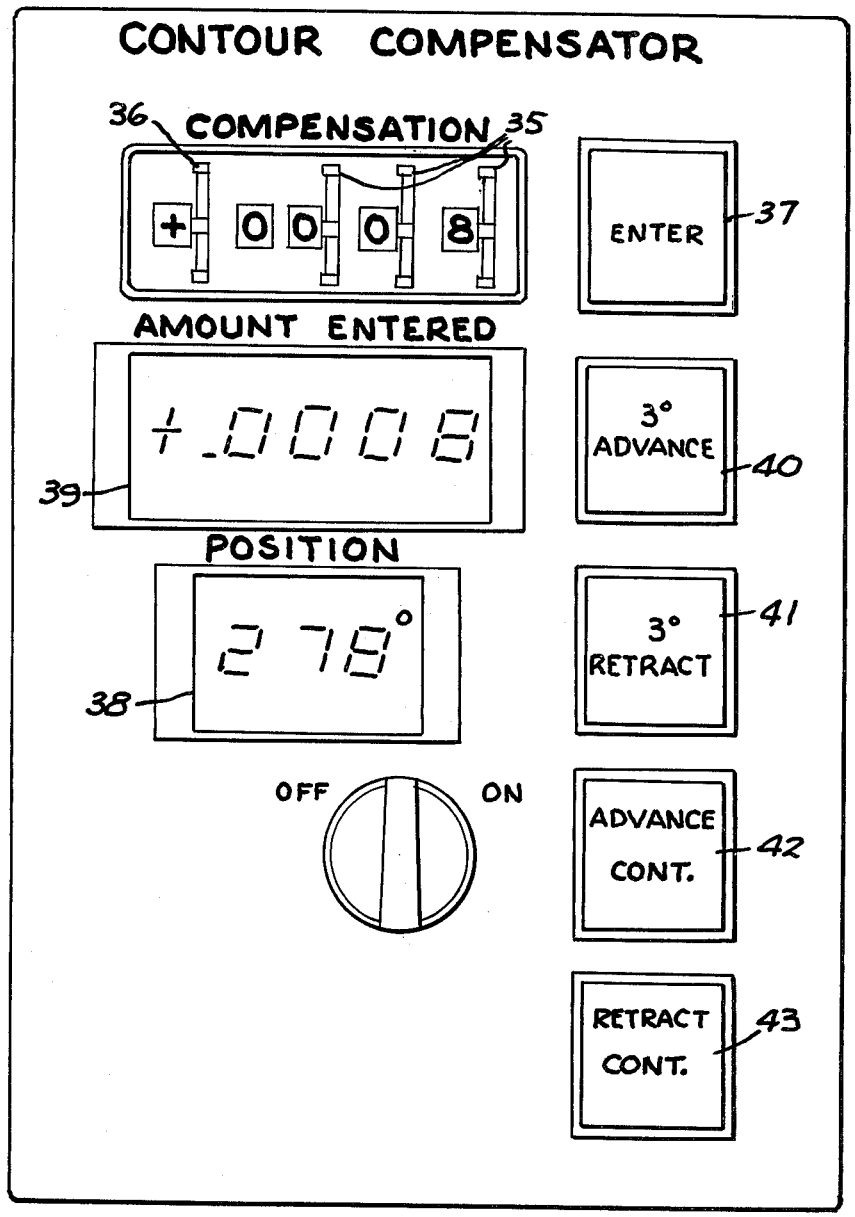
FIG. 6 is an elevational view of a control panel.

A typical control panel is shown in FIG. 6.

In a normal programming procedure the operator will start at memory location number one (0°) select the deviation on a thumbwheel switch 35 and select plus or minus on wheel 36. He then depresses the enter button 37 which enters the displayed data in the first memory location. This also advances the visual display to the second memory location (3°). The operator then dials in the deviation desired at that memory location and again depresses the enter button 37. This sequence continues for the entire 120 points. Should no change in deviation be required, the operator continues to depress the enter button 37.

After the program has been generated, the operator may scan through the memory and alter any data point required in a matter of seconds.

The memory location is visually displayed at 38 as well as the value stored in that location at 39.

More specifically an operator programs in the deviation points from a work sheet. Assume +.0012 is the data to be loaded in the first memory location. The value .0012 is selected on the thumbwheel switches 35 and the sign on switch 36, and the operator depresses "Continuous Advance" button 42 to bring up the first memory location on the memory location display.

The data is now entered by depressing the enter button 37.

The memory location now displayed is the second location.

Assume +.0012 is to be programmed in 10 more times in locations 2 through 11, the operator depresses the same button 37 for 10 times. This sequence continues until the entire program is loaded.

Assume that a number of parts have been ground with the above program and it is found that slight geometry changes are needed in some of the memory locations.

The operator advances or reverses the program to the desired location, dials in the corrected value and enters it either + or −. This affects only the memory location selected, and alleviates the necessity of entering a whole new program.

The internal circuitry is designed to generate an analog voltage as a result of the magnitude of the programmed data. Since there is a finite number of points to be programmed it is necessary that the transition from one point to another be smooth. This is accomplished by looking ahead in the memory locations and determining the magnitude of change from one step to the next. Knowing this permits the selection of time constants that will give a smooth curve going through the mean memory locations.

Since the workpiece surface is not circular, the angular displacement for any increment of angle is not necessarily constant and this becomes one of the factors that helps compensate to fit the curve to the programmed points.

Figure 5:
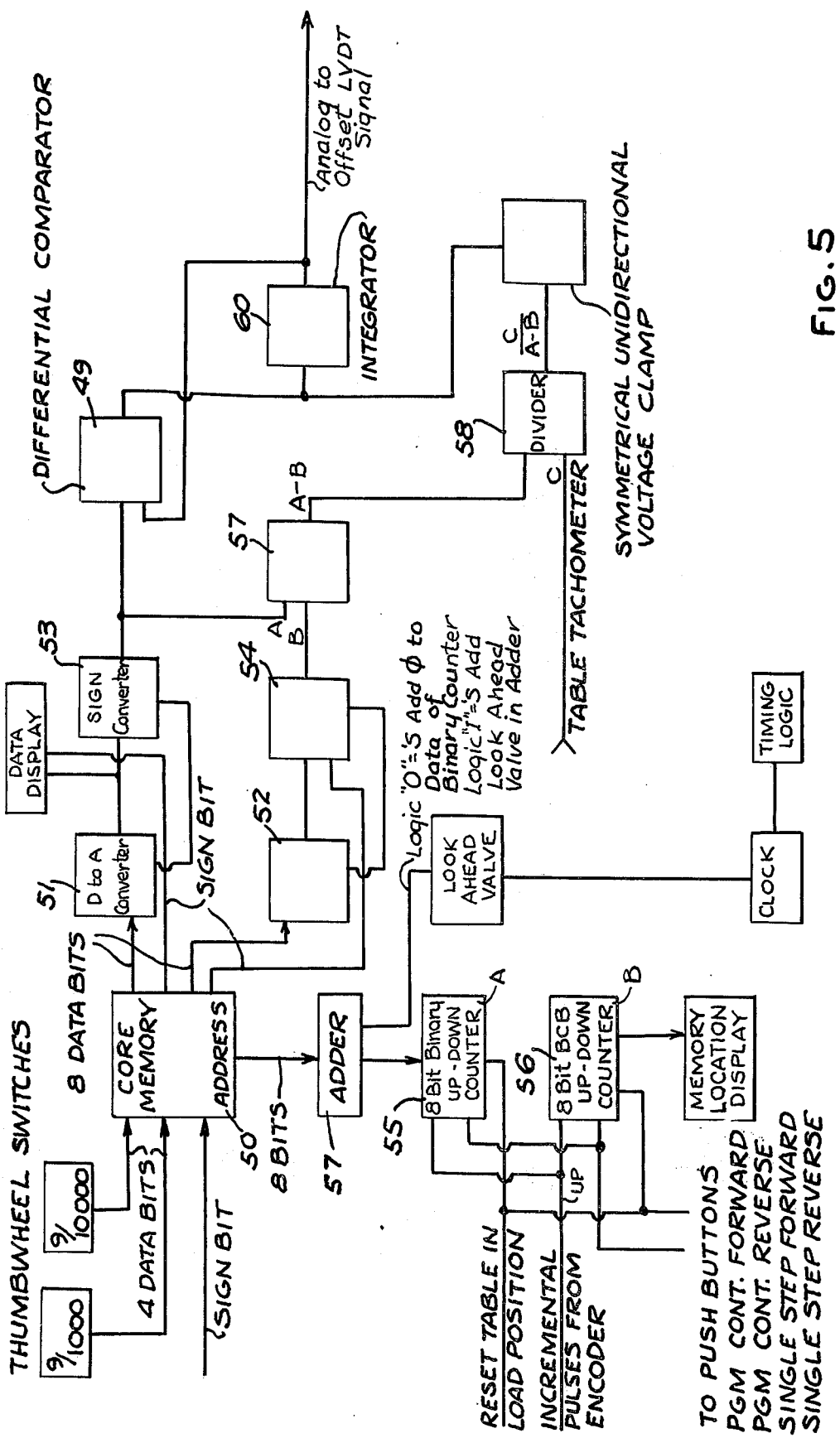
FIG. 5 is a block diagram of the electronic circuit.

A block diagram of the compensator structure for producing a modified signal is shown in FIG. 5. As can be seen, the information from the thumbwheel switches 35, 36 is introduced as nine data bits to a core memory 50. The output from the core memory passes to digital to analog converters 51, 52 and, in turn, to a sign converters 53, 54.

In order to provide a proper transition from one memory location to another, it is desirable that the transition between memory locations be no greater than a predetermined amount. Accordingly, provision is made for looking ahead and entering an additional signal only to a predetermined value. The looking ahead may occur at any one or more of the memory locations and is achieved by providing a pulse from an optical encoder that corresponds to the peripheral actual location on the secondary cam. This can be taken from the primary servo drive. This information is introduced to an up-down counter 55, 56 and the adder 57 produces a look ahead value provided to the digital to analog converters 51, 52. The data A corresponding to the data to be introduced for the actual position of the table is compared to the data B corresponding to a position ahead as may have been selected in a summing network to insure a smooth transition between points.

A further input is to change the response of any integrator with the speed of rotation of the workpiece if several changes must occur more rapidly so a table tachometer input is provided to the divider 58 that functions to generate the relationship C over A minus B and determine how fast the integration will take place. If C is greater, the response will be faster. If A minus B is greater, the response will decrease. The net signal to be supplied to the servo control to modify the LVDT signal is then determined by the integrator 60.

It can thus be seen that the apparatus provides for modifying the signal to the servo drive which is produced by the tracer or cam follower so that any desired change in the contour can be produced. The change in contour, however, is controlled and further refined so that the transition between selected locations along the cam will be uniform and not abrupt.

I claim:

1. In a machine tool, the combination comprising means for supporting a workpiece, a tool,
means for supporting the tool for movement relative to the workpiece,
a cam,
a cam follower,
means controlled by the cam follower for moving the tool and the workpiece relative to one another in accordance with the position of the cam follower on the cam,
programmable means for providing a change in movement of the tool relative to the workpiece at any desired point on the cam,
said programmable means including a plurality of memory locations corresponding to varying positions of the cam follower on the cam,
means for applying information to each location,
means responsive to the imformation corresponding to the information at another location and operable to prevent the information which exceeds a predetermined value from said first-mentioned location from passing to the means for controlling the relative positions of the workpiece and tool.

2. In a machine tool, the combination comprising
means for supporting a workpiece,
a tool,
means for supporting the tool for movement relative to the workpiece,
a cam,
a cam follower,
means controlled by the cam follower for moving the tool and the workpiece relative to one another in accordance with the position of the cam follower on the cam,
programmable means for providing a change in movement of the tool relative to the workpiece at any desired point on the cam,
said programmable means comprising
digital programmable means having a plurality of memory locations,
means for applying digital information corresponding to various positions on the cam to each location,
means for converting the information in said digital programmable means to an analog,
means for applying the analog to a cam follower signal to modify said signal at any location.

3. In a machine tool, the combination comprising
a tool,
means for supporting a workpiece for lineal and rotational movement with respect to the tool,
means for supporting the tool for movement relative to the workpiece,
cam and cam follower means for moving the workpiece in said lineal path,
second cam and cam follower means for moving said tool,
programmable means for providing a change in movement of the tool relative to the workpiece at any desired point on the second cam,
said programmable means including a plurality of memory locations corresponding to varying positions of the cam follower on the second cam,
means for applying information to each location,
means responsive to the information corresponding to the information at another location and operable to prevent the information which exceeds a predetermined value from said first-mentioned location from passing to the means for controlling the relative positions of the workpiece and tool.

4. The combination set forth in claim 3 wherein said tool comprises a rotatable grinding wheel.

5. In a machine tool, the combination comprising
a tool,
means for supporting a workpiece for lineal and rotational movement with respect to the tool,
means for supporting the tool for movement relative to the workpiece,
cam and cam follower means for moving the workpiece in said lineal path,
second cam and cam follower means for moving said tool,
programmable means for providing a change in movement of the tool relative to the workpiece at any desired point on the second cam,
said programmable means comprising
digital programmable means having a plurality of memory locations,
means for applying digital information corresponding to various positions on the second cam to each location,
means for converting the information in said digital programmable means to an analog,
means for applying the analog to a cam follower signal from said second cam to modify said signal at any location.

* * * * *